United States Patent
Singh

(10) Patent No.: US 10,603,962 B2
(45) Date of Patent: Mar. 31, 2020

(54) TIRE WEAR STATE ESTIMATION SYSTEM AND METHOD

(71) Applicant: The Goodyear Tire & Rubber Company, Akron, OH (US)

(72) Inventor: Kanwar Bharat Singh, Lorenztweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 175 days.

(21) Appl. No.: 16/012,058

(22) Filed: Jun. 19, 2018

(65) Prior Publication Data

US 2019/0001757 A1  Jan. 3, 2019

Related U.S. Application Data

(60) Provisional application No. 62/526,512, filed on Jun. 29, 2017.

(51) Int. Cl.
*B60C 11/24* (2006.01)
*G01M 17/02* (2006.01)
(Continued)

(52) U.S. Cl.
CPC ........ *B60C 11/246* (2013.01); *B60C 23/0408* (2013.01); *B60C 23/0415* (2013.01);
(Continued)

(58) Field of Classification Search
USPC ................................................ 73/146–146.8
See application file for complete search history.

(56) References Cited

U.S. PATENT DOCUMENTS

| 3,563,088 A * | 2/1971 | Sperberg ............ B29D 30/0633 |
| | | 73/146 |
| 7,320,246 B2 * | 1/2008 | Schick .................... B60C 11/24 |
| | | 702/188 |

(Continued)

FOREIGN PATENT DOCUMENTS

| EP | 2813378 A1 | 12/2014 |
| EP | 2927065 A1 | 10/2015 |

OTHER PUBLICATIONS

EPO search report completed Oct. 11, 2018 and received by Applicant dated Oct. 22, 2018.

*Primary Examiner* — Andre J Allen
(74) *Attorney, Agent, or Firm* — Edward T. Kennedy

(57) ABSTRACT

A tire wear state estimation system includes at least one sensor disposed on a vehicle and a CAN bus system. The sensor measures selected parameters associated with the vehicle and communicates data for the selected parameters through the CAN bus system, including a first set of data, a second set of data and a third set of data. A rolling radius estimator receives the first set of data and estimates a rolling radius for the tire. An acceleration slip estimator receives the second set of data and the estimated rolling radius to estimate the slip of the tire during acceleration. A braking slip estimator receives the third set of data and the estimated rolling radius to estimate the slip of the tire during braking. A tire slip analyzer correlates the acceleration slip estimation and the braking slip estimation and generates an estimated wear state of the tire.

20 Claims, 14 Drawing Sheets

(51) Int. Cl.
*B60C 23/04* (2006.01)
*B60C 23/06* (2006.01)
*B60W 40/12* (2012.01)

(52) U.S. Cl.
CPC ...... *B60C 23/0474* (2013.01); *B60C 23/0488* (2013.01); *B60C 23/061* (2013.01); *B60W 40/12* (2013.01); *G01M 17/02* (2013.01)

(56) References Cited

U.S. PATENT DOCUMENTS

| | | |
|---|---|---|
| 8,886,395 B2 | 11/2014 | Singh et al. |
| 8,983,716 B2 | 3/2015 | Singh et al. |
| 8,983,749 B1 | 3/2015 | Singh |
| 9,259,976 B2 | 2/2016 | Singh et al. |
| 9,610,810 B1 | 4/2017 | Singh |
| 9,650,053 B2 | 5/2017 | Singh et al. |
| 9,663,115 B2 | 5/2017 | Singh |
| 9,752,962 B2 | 9/2017 | Singh |
| 9,873,293 B2 | 1/2018 | Singh et al. |
| 2006/0156790 A1* | 7/2006 | Bocquillon ............ B60C 11/24 73/8 |
| 2015/0034222 A1* | 2/2015 | Martin .................. B60C 11/243 152/154.2 |
| 2015/0057877 A1 | 2/2015 | Singh |
| 2016/0033367 A1* | 2/2016 | Unterreiner ......... G01M 17/022 73/8 |
| 2016/0146706 A1* | 5/2016 | Singh ..................... G01N 3/56 73/8 |
| 2019/0001757 A1 | 1/2019 | Singh |
| 2019/0270347 A1* | 9/2019 | Stewart .................. B60C 11/24 |

\* cited by examiner

TIRE WEAR STATE ESTIMATION SYSTEM AND METHOD

FIELD OF THE INVENTION

The invention relates generally to tire monitoring systems. More particularly, the invention relates to systems that predict tire wear. Specifically, the invention is directed to a system and method for estimating tire wear state based upon tire slip during acceleration and braking events.

BACKGROUND OF THE INVENTION

Tire wear plays an important role in vehicle factors such as safety, reliability, and performance. Tread wear, which refers to the loss of material from the tread of the tire, directly affects such vehicle factors. As a result, it is desirable to monitor and/or measure the amount of tread wear experienced by a tire.

One approach to the monitoring and/or measurement of tread wear has been through the use of wear sensors disposed in the tire tread, which has been referred to a direct method or approach. The direct approach to measuring tire wear from tire mounted sensors has multiple challenges. Placing the sensors in an uncured or "green" tire to then be cured at high temperatures may cause damage to the wear sensors. In addition, sensor durability can prove to be an issue in meeting the millions of cycles requirement for tires. Moreover, wear sensors in a direct measurement approach must be small enough not to cause any uniformity problems as the tire rotates at high speeds. Finally, wear sensors can be costly and add significantly to the cost of the tire.

Due to such challenges, alternative approaches were developed, which involved prediction of tread wear over the life of the tire, including indirect estimations of the tire wear state. These alternative approaches have experienced certain disadvantages in the prior art due to a lack of optimum prediction techniques, which in turn reduces the accuracy and/or reliability of the tread wear predictions. For example, one approach to indirect estimation of the tire wear state has been to focus on tire longitudinal stiffness as determined by the relationship between longitudinal force and longitudinal slip. However, longitudinal force estimation requires wheel torque information, which is not a standard vehicle system signal. Instead, such estimations may instead employ engine torque information from the internal combustion engine (ICE) management system. Engine torque information is not accurate under all driving conditions in estimating longitudinal force, which leads to a less-than-accurate estimation of tire longitudinal stiffness and tire wear state.

As a result, there is a need in the art for a system and method that is better in practice than prior art systems and accurately and reliably estimates tire wear state.

SUMMARY OF THE INVENTION

According to an aspect of an exemplary embodiment of the invention, a tire wear state estimation system is provided. The system includes at least one tire that supports a vehicle. A CAN bus system is disposed on the vehicle and at least one sensor is disposed on the vehicle and is in electronic communication with the CAN bus system. The at least one sensor measures selected parameters associated with the vehicle and communicates data for the selected parameters through the CAN bus system, including a first set of data, a second set of data and a third set of data. A rolling radius estimator is operative to receive the first set of data and estimates a rolling radius for the at least one tire. An acceleration slip estimator is operative to receive the second set of data and the estimated rolling radius to estimate the slip of the at least one tire during acceleration of the vehicle. A braking slip estimator is operative to receive the third set of data and the estimated rolling radius to estimate the slip of the at least one tire during braking of the vehicle. A tire slip analyzer correlates the estimation of the slip of the at least one tire during acceleration of the vehicle and the slip of the at least one tire during braking of the vehicle and generates an estimated wear state of the at least one tire.

According to another aspect of an exemplary embodiment of the invention, a method for estimating the wear state of a tire supporting a vehicle is provided. The method includes providing at least one sensor that is disposed on the vehicle and is in electronic communication with a CAN bus system. Selected parameters associated with the vehicle are measured using the at least one sensor. Data for the selected parameters is communicated through the CAN bus system, including a first set of data, a second set of data and a third set of data. A rolling radius for the at least one tire is estimated with the first set of data. The slip of the at least one tire during acceleration of the vehicle is estimated with the second set of data and the estimated rolling radius. The slip of the at least one tire during braking of the vehicle is estimated with the third set of data and the estimated rolling radius. The estimation of the slip of the at least one tire during acceleration of the vehicle and the slip of the at least one tire during braking of the vehicle is correlated to generate an estimated wear state of the at least one tire.

BRIEF DESCRIPTION OF THE DRAWINGS

The invention will be described by way of example and with reference to the accompanying drawings, in which.

Similar numerals refer to similar parts throughout the drawings.

Definitions

Figure 1:
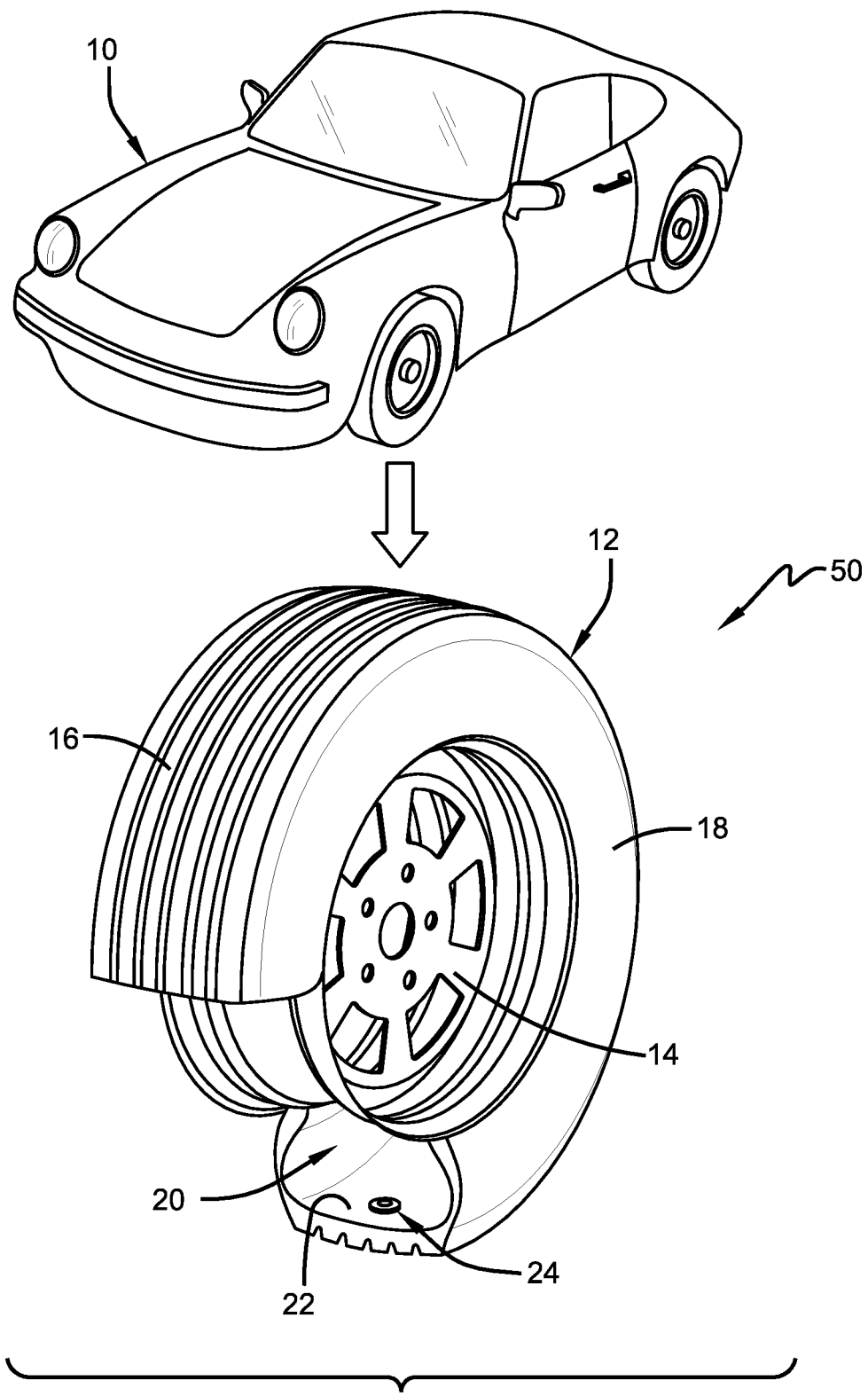
FIG. 1 is a perspective view of a vehicle and sensor-equipped tire.

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Kalman filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Piezoelectric film sensor" a device in the form of a film body that uses the piezoelectric effect actuated by a bending of the film body to measure pressure, acceleration, strain or force by converting them to an electrical charge.

"PSD" is power spectral density (a technical name synonymous with FFT (fast fourier transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape having adjacent grooves.

"Tread arc width" means the arc length of the tread as measured between the lateral edges of the tread.

DETAILED DESCRIPTION OF THE INVENTION

Figure 2:
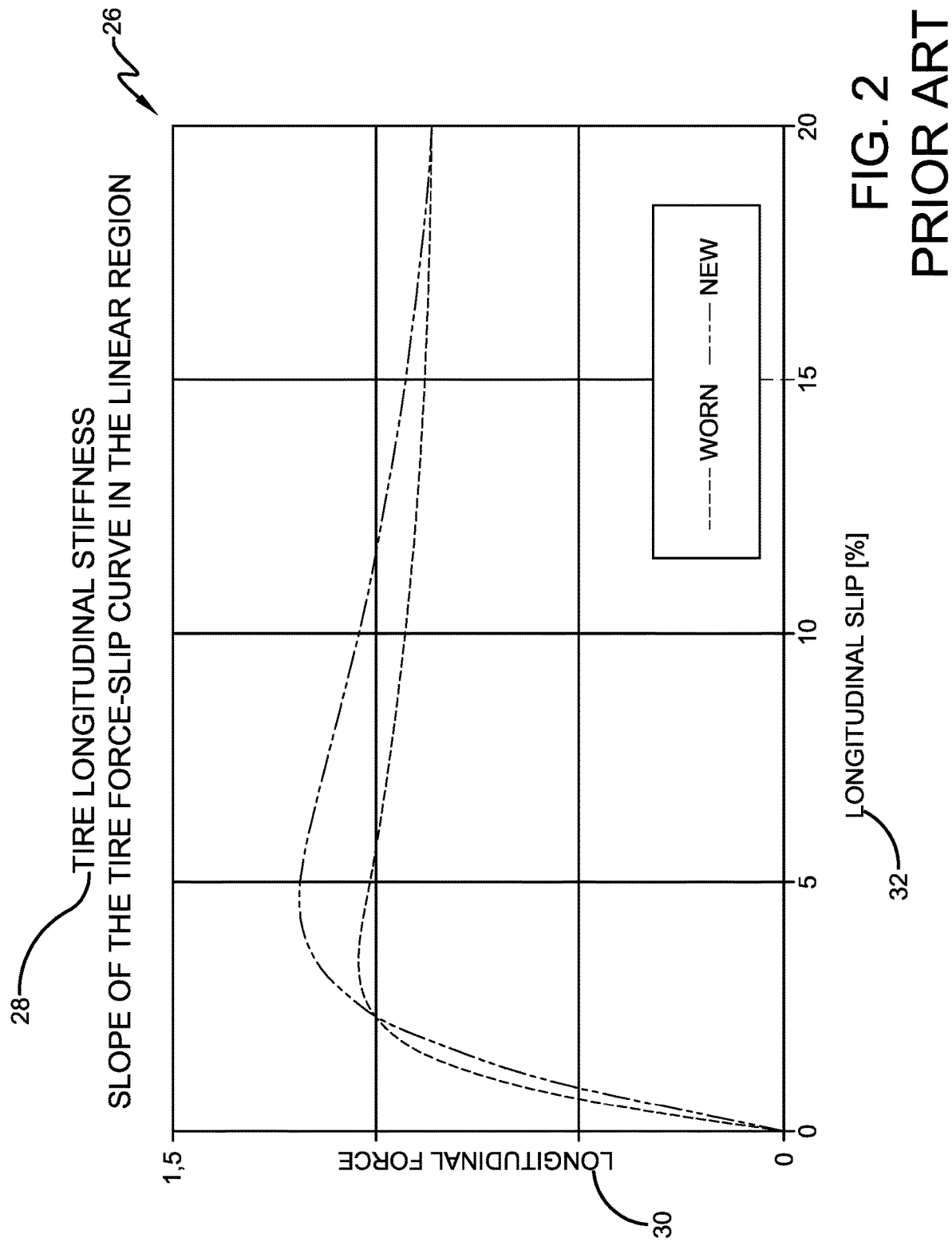
FIG. 2 is a graphical representation employed in the prior art showing longitudinal force versus longitudinal slip to calculate tire longitudinal stiffness.
Figure 3:
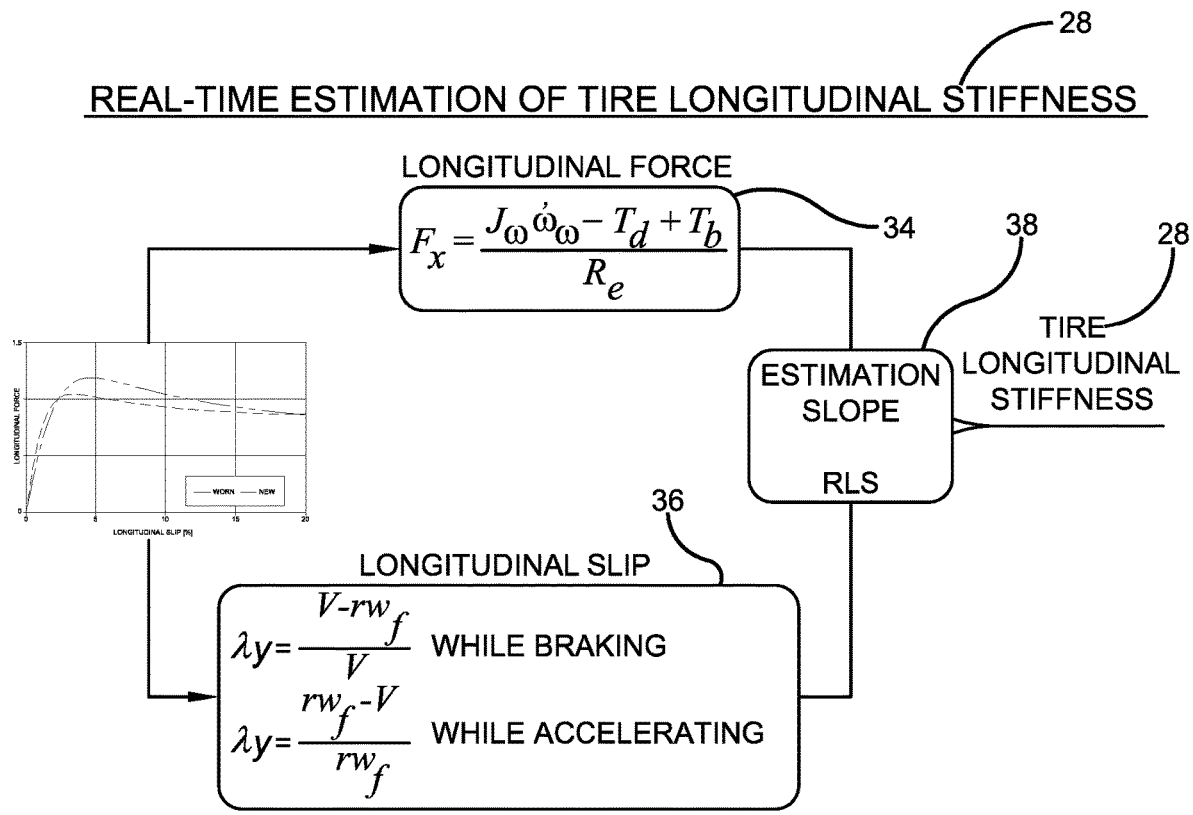
FIG. 3 is a diagram showing prior art estimation of tire longitudinal stiffness from longitudinal force and longitudinal slip.

Turning first to FIGS. 2 and 3, in the prior art, one approach to indirect estimation of the tire wear state has been to focus on tire longitudinal stiffness 28 as determined by the relationship between longitudinal force 30 and longitudinal slip 32. Longitudinal force 30 is calculated using a longitudinal force equation 34, and longitudinal slip 32 is calculated using a longitudinal slip equation 36. The slope 38 of the curve of longitudinal force 30 versus longitudinal slip 32 yields the tire longitudinal stiffness 28, which in turn is indicative of the tire wear state. However, the longitudinal force calculation 36 requires wheel torque information $T_d$ and $T_b$, which is not a standard vehicle system signal. Instead, engine torque information from the internal combustion engine (ICE) management system is often employed. Because engine torque information is not accurate under all driving conditions in estimating the longitudinal force 30, the prior art technique 26 leads to a less-than-accurate estimation of tire longitudinal stiffness 28 and thus of the tire wear state.

Turning now to FIGS. 1 and 4 through 14, an exemplary embodiment of the tire wear state estimation system of the present invention is indicated at 50. With particular reference to FIG. 1, the system 50 estimates the tread wear on each tire 12 supporting a vehicle 10. While the vehicle 10 is depicted as a passenger car, the invention is not to be so restricted. The principles of the invention find application in other vehicle categories such as commercial trucks in which vehicles may be supported by more or fewer tires.

The tires 12 are of conventional construction, and are mounted on a wheel 14. Each tire includes a pair of sidewalls 18 that extend to a circumferential tread 16, which wears from road abrasion with age. Each tire 12 preferably is equipped with a sensor or transducer 24 that is mounted to the tire for the purpose of detecting certain real-time tire parameters, such as tire pressure and temperature. The sensor 24 preferably also includes a tire identification (tire ID) for each specific tire 12, and transmits measured parameters and tire ID data to a remote processor, such as a processor integrated into the vehicle CAN bus 52 (FIG. 4), for analysis. The sensor 24 may be a tire pressure monitoring (TPMS) module or sensor, and is of a type commercially available. The sensor 24 preferably is affixed to an inner liner 22 of the tire 12 by suitable means such as adhesive. The sensor 24 may be of any known configuration, such as piezoelectric sensors that detect a pressure within a tire cavity 20.

The tire wear state estimation system 50 and accompanying method attempts to overcome the challenges posed by prior art methods that measure the tire wear state through direct sensor measurements. As such, the subject system and method is referred herein as an "indirect" wear sensing system and method that estimates wear state. The prior art direct approach to measuring tire wear from tire mounted sensors has multiple challenges, which are described above. The tire wear estimation state system 50 and accompanying method utilize an indirect approach, and avoid the problems attendant use of tire wear sensors mounted directly to the tire tread 16.

Aspects of the tire wear state estimation system 50 preferably are executed on a processor that is accessible through the vehicle CAN bus, which enables input of data from the sensor 24, as well as input of data from a lookup table or a database that is stored in a suitable storage medium and is in electronic communication with the processor. Rather than a direct estimate of tire wear or tire longitudinal stiffness 28, the tire wear state estimation system 50 focuses on analyzing the tire slip while the vehicle 10 is braking and/or accelerating. It is to be noted that, for the purpose of convenience, the term "tread wear" may be used interchangeably herein with the term "tire wear".

Figure 4:
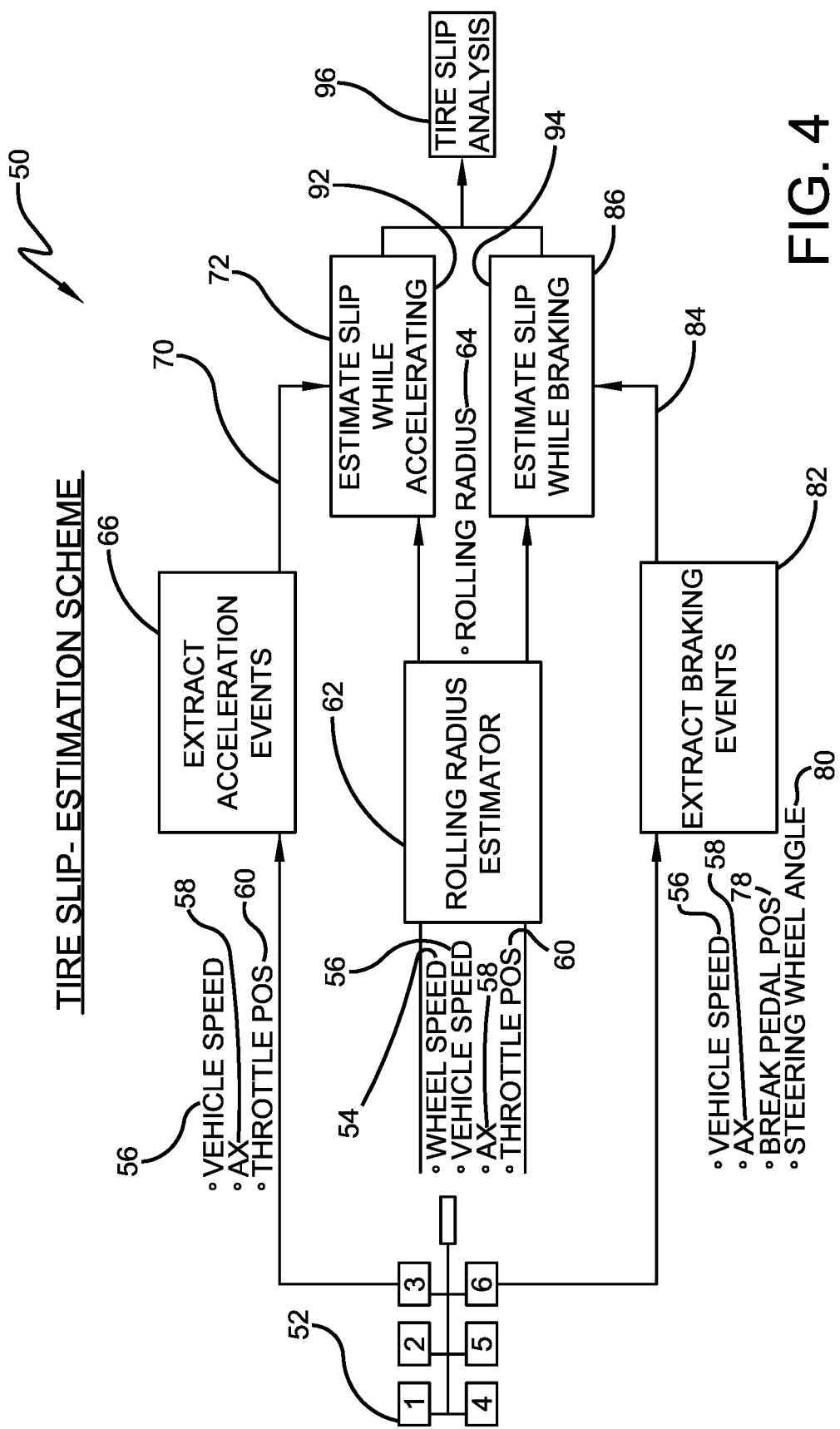
FIG. 4 is a flow diagram showing an exemplary embodiment of the tire wear state estimation system and method of the present invention.
Figure 5:
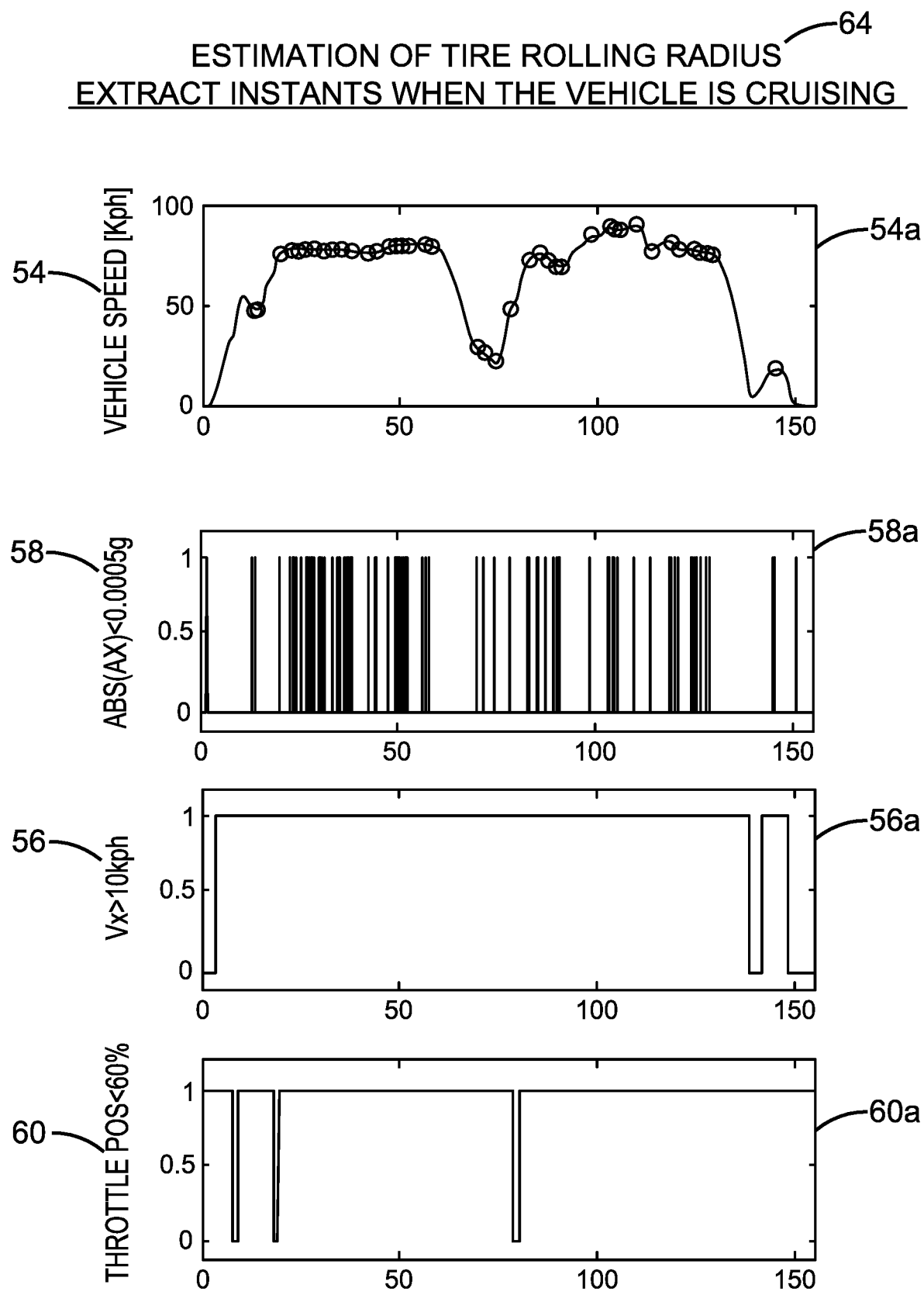
FIG. 5 is a histogram representation of parameters employed in the estimation of tire rolling radius for the exemplary embodiment of the tire wear state estimation system and method of the present invention.

Turning now to FIG. 4, the tire wear state estimation system 50 includes the use of certain parameters measured by sensors that are mounted on the vehicle and which are in electronic communication with the vehicle CAN bus system 52. Specifically, the CAN bus 52 electronically communicates wheel speed 54, vehicle speed 56, vehicle acceleration 58 and throttle position 60 to a rolling radius estimator 62. As shown in FIG. 5, the rolling radius estimator 62 records the wheel speed 54, vehicle speed 56, vehicle acceleration 58 and throttle position 60 data and generates a histogram 54a, 56a, 58a and 60a for each parameter over a selected period of time. Using batch mode estimation, the rolling radius estimator 62 generates a rolling radius estimation 64 of the tire 12. Other techniques for estimating rolling radius may be employed, such as the techniques described in U.S. Pat. No. 9,663,115, titled "Method For Estimating Tire Forces From Can-Bus Accessible Sensor Inputs"; U.S. Pat. No. 9,873,293, titled "Indirect Tire Wear State Prediction System and Method"; and U.S. Pat. No. 9,752,962, titled "Robust Tire Forces Estimation System", all of which are owned by the same assignee as the present invention, The Goodyear Tire & Rubber Company, and which are hereby incorporated by reference.

Figure 6:
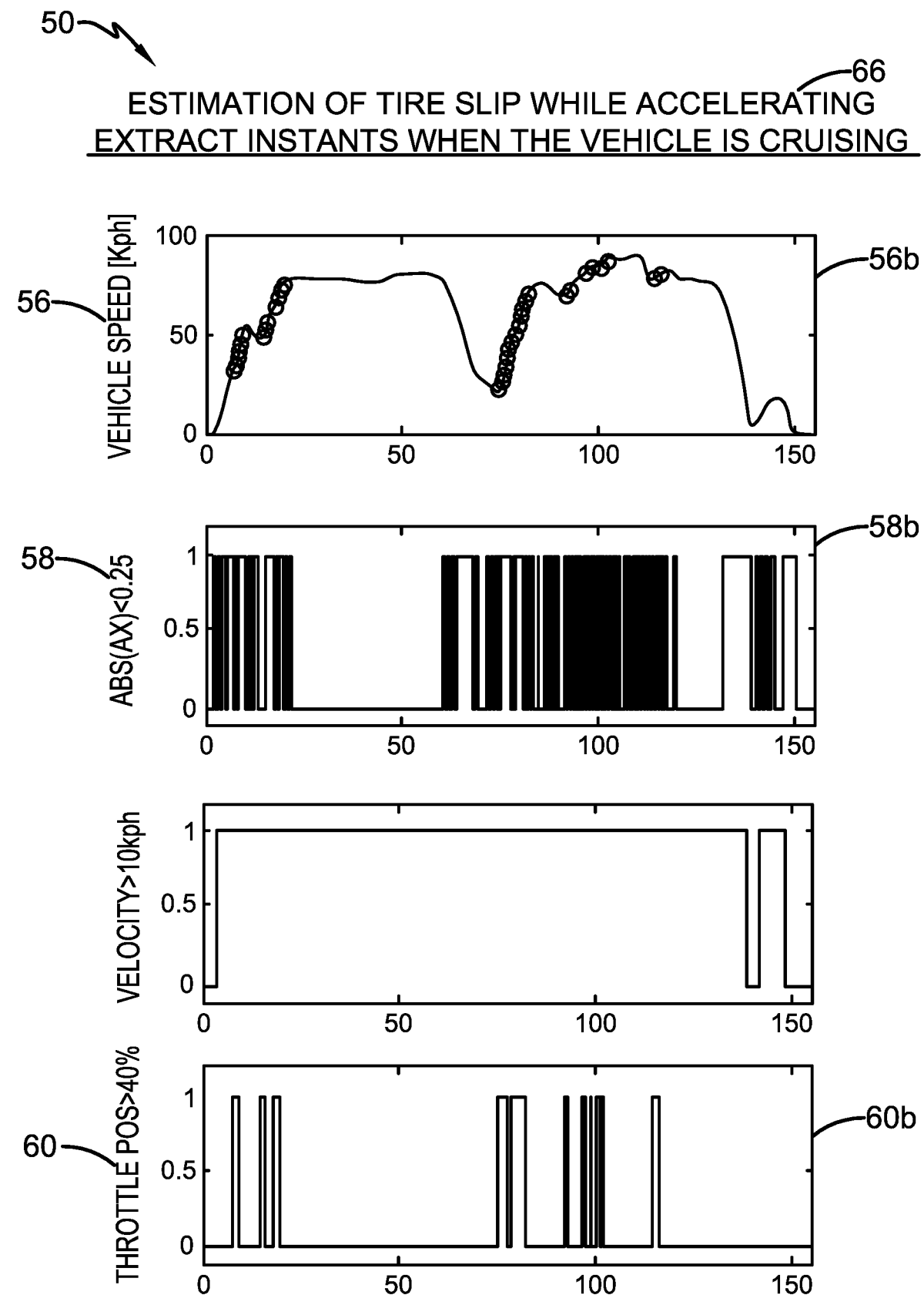
FIG. 6 is a histogram representation of parameters employed in the estimation of tire slip while accelerating for the exemplary embodiment of the tire wear state estimation system and method of the present invention.
Figure 8:
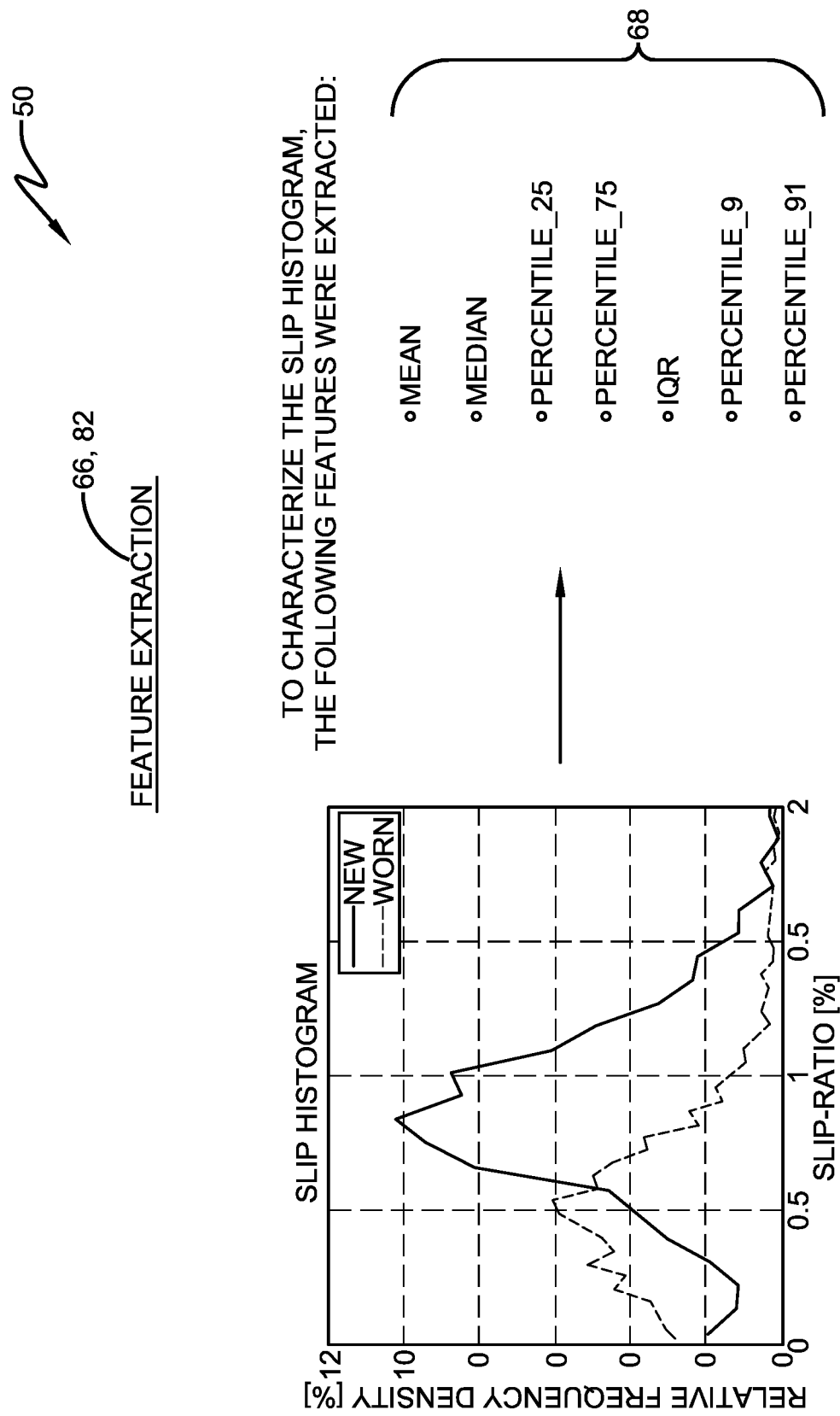
FIG. 8 is a diagram showing feature extraction for the exemplary embodiment of the tire wear state estimation system and method of the present invention.
Figure 9:
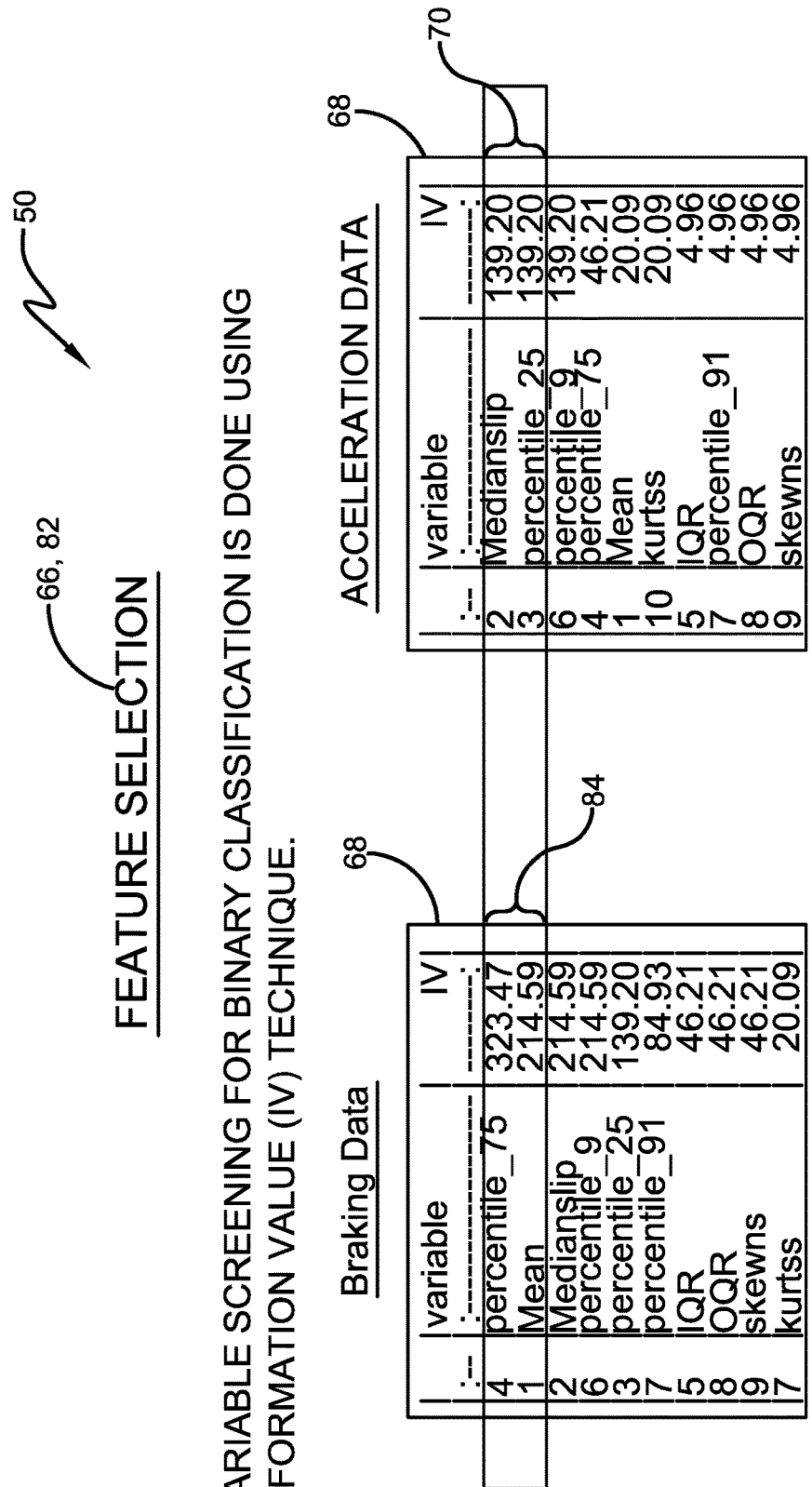
FIG. 9 is a diagram showing feature selection for the exemplary embodiment of the tire wear state estimation system and method of the present invention.

Returning now to FIG. 4, the CAN bus 52 also electronically communicates vehicle speed 56, vehicle acceleration 58 and throttle position 60 to an acceleration event extractor 66. As shown in FIG. 6, the acceleration event extractor 66 records the vehicle speed 56, vehicle acceleration 58 and throttle position 60 data and generates a histogram 56b, 58b and 60b for each parameter over a selected period of time. The acceleration event extractor 66 characterizes the data from each slip histogram 56b, 58b and 60b according to selected features 68, such as mean, median, $25^{th}$ percentile, $75^{th}$ percentile, interquartile range (IQR) or midspread, $9^{th}$ percentile and $91^{st}$ percentile as shown in FIG. 8. The acceleration event extractor 66 then screens and selects the most relevant of the features 68 for acceleration as shown in FIG. 9. The most relevant of the features 68 preferably are predetermined. By way of example for acceleration, the median and the $25^{th}$ percentile may be the most relevant of the features 68, and thus may be referred to as extracted acceleration events 70.

With reference again to FIG. 4, the extracted acceleration events 70 and the rolling radius estimate 64 are electronically communicated to an acceleration slip estimator 72. The acceleration slip estimator 72 employs batch mode estimation to estimate slip when the vehicle 10 is accelerating.

Figure 12:
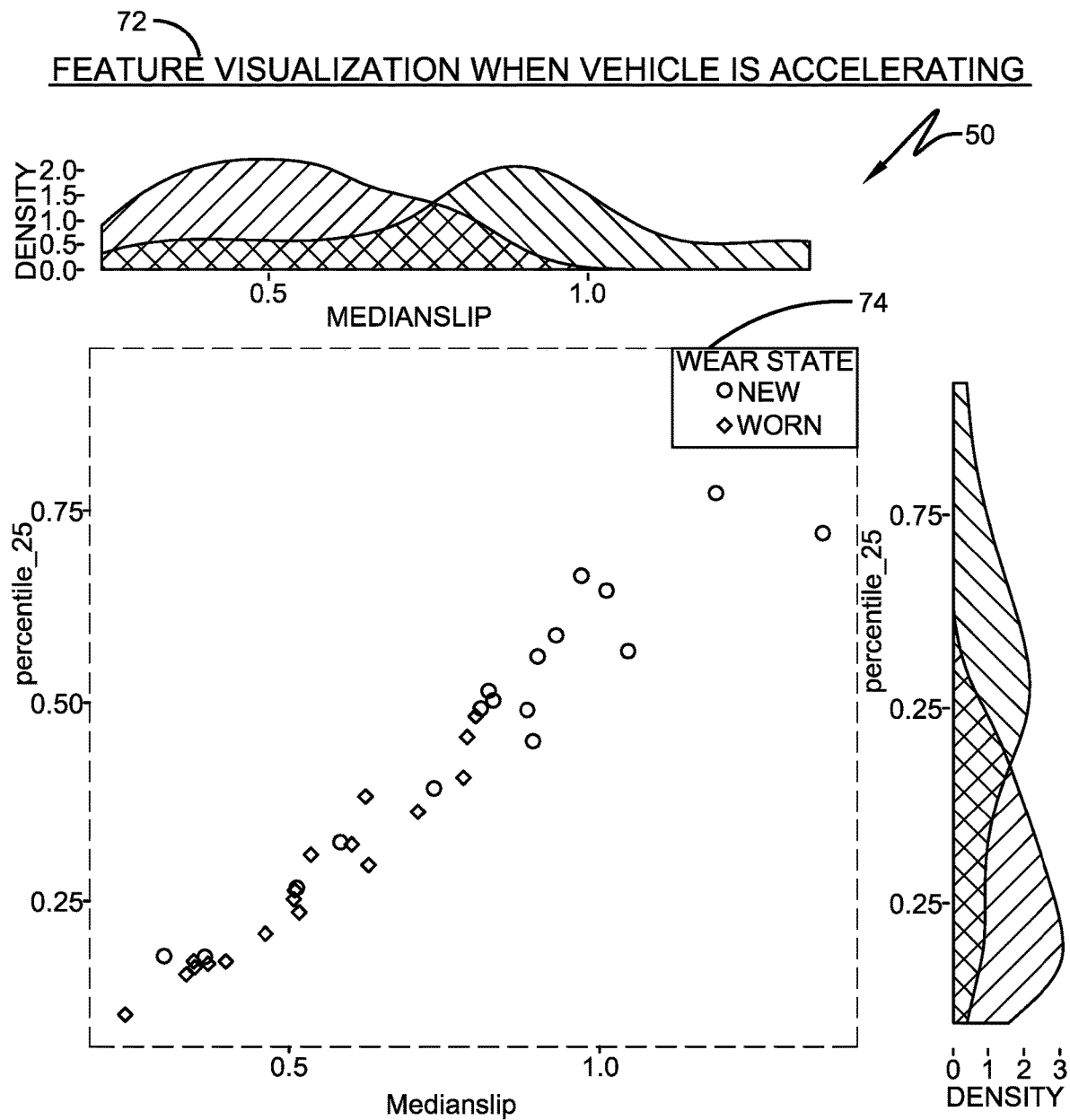
FIG. 12 is a graphical representation of feature visualization when the vehicle is accelerating for the exemplary embodiment of the tire wear state estimation system and method of the present invention.
Figure 13:
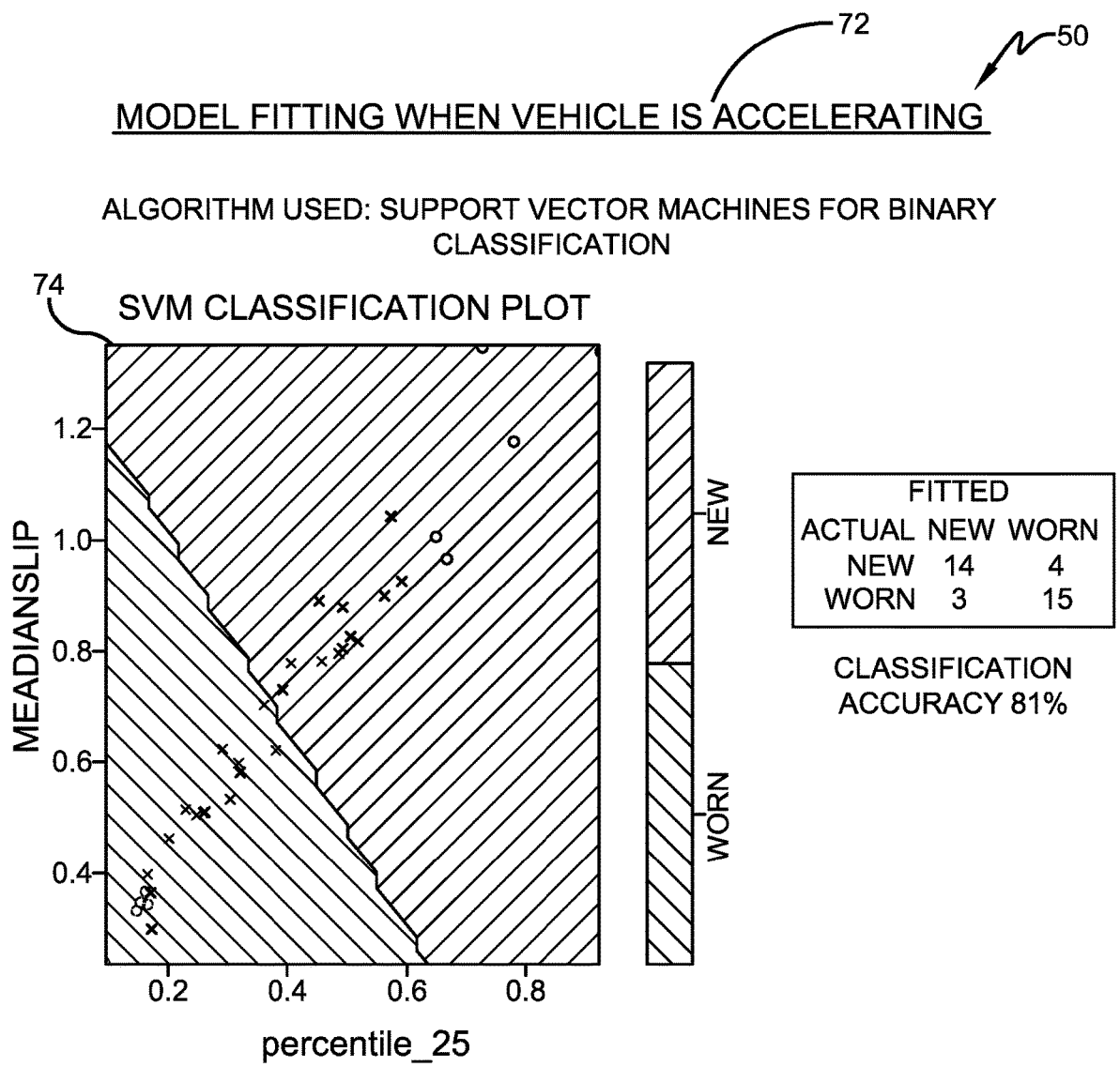
FIG. 13 is a graphical representation of model fitting when the vehicle is accelerating for the exemplary embodiment of the tire wear state estimation system and method of the present invention.

As shown in FIGS. 12 and 13, the acceleration slip estimator 72 performs feature visualization 74 and model fitting 76 of the extracted acceleration events 70. Having extracted the two most relevant features, which are the extracted acceleration events 70, a classification algorithm is used, such as a binary classifier based on support vector machine (SVM) algorithm. Performance of the binary classifier is shown in FIG. 13. Using the longitudinal slip formula 36 (FIG. 3), the acceleration slip estimator 72 calculates the estimated slip 94 of the tire 12 while the vehicle 10 is accelerating.

Figure 7:
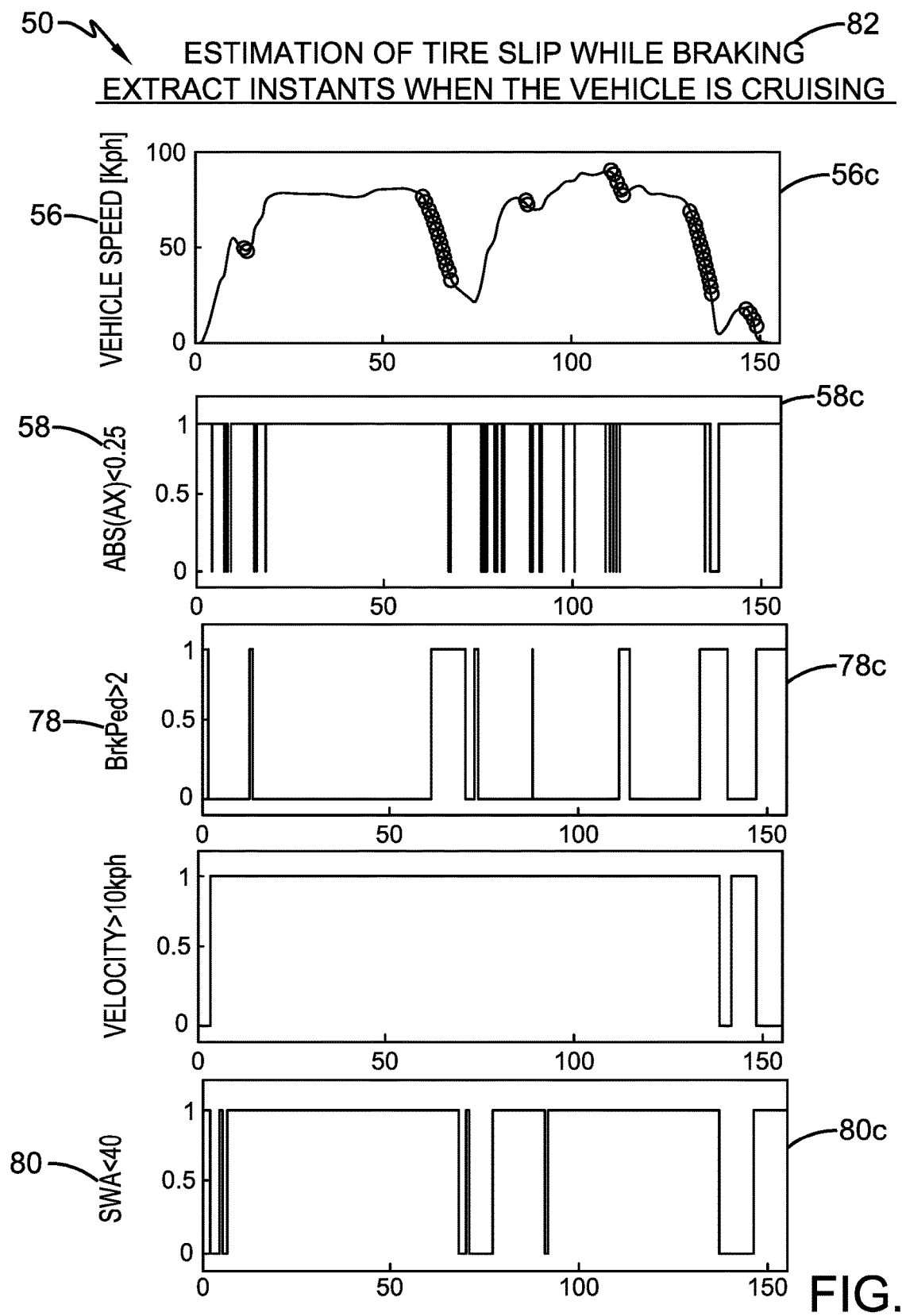
FIG. 7 is a histogram representation of parameters employed in the estimation of tire slip while braking for the exemplary embodiment of the tire wear state estimation system and method of the present invention.

Returning to FIG. 4, the CAN bus 52 also electronically communicates vehicle speed 56 and vehicle acceleration 58, as well as brake pedal position 78 and steering wheel angle 80, to a braking event extractor 82. As shown in FIG. 7, the braking event extractor 82 records the vehicle speed 56, vehicle acceleration 58, brake pedal position 78 and steering wheel angle 80 data and generates a histogram 56c, 58c, 78c and 80c for each parameter over a selected period of time. The braking event extractor 82 characterizes the data from each slip histogram 56c, 58c, 78c and 80c according to selected features 68, such as mean, median, $25^{th}$ percentile, $75^{th}$ percentile, interquartile range (IQR) or midspread, $9^{th}$ percentile and $91^{st}$ percentile as shown in FIG. 8. The braking event extractor 82 then screens and selects the most relevant of the features 68 for braking as shown in FIG. 9. The most relevant of the features 68 preferably are predetermined. By way of example for braking, the mean and the $75^{th}$ percentile may be the most relevant of the features 68, and thus may be referred to as extracted braking events 84.

Turning again to FIG. 4, the extracted braking events 84 and the rolling radius estimate 64 are electronically communicated to a braking slip estimator 86. The braking slip estimator 86 employs batch mode estimation to estimate slip when the vehicle 10 is braking.

Figure 10:
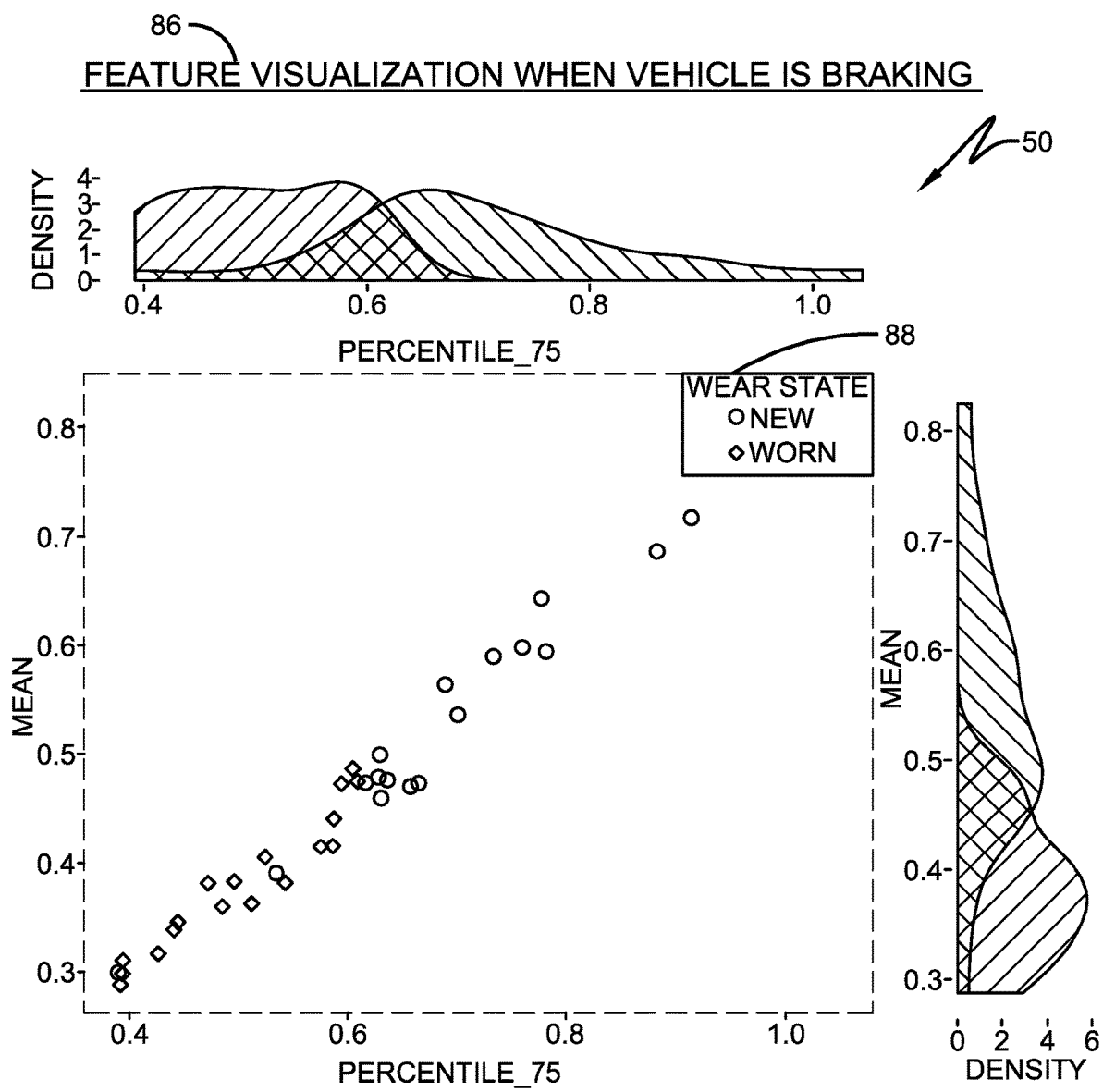
FIG. 10 is a graphical representation of feature visualization when the vehicle is braking for the exemplary embodiment of the tire wear state estimation system and method of the present invention.
Figure 11:
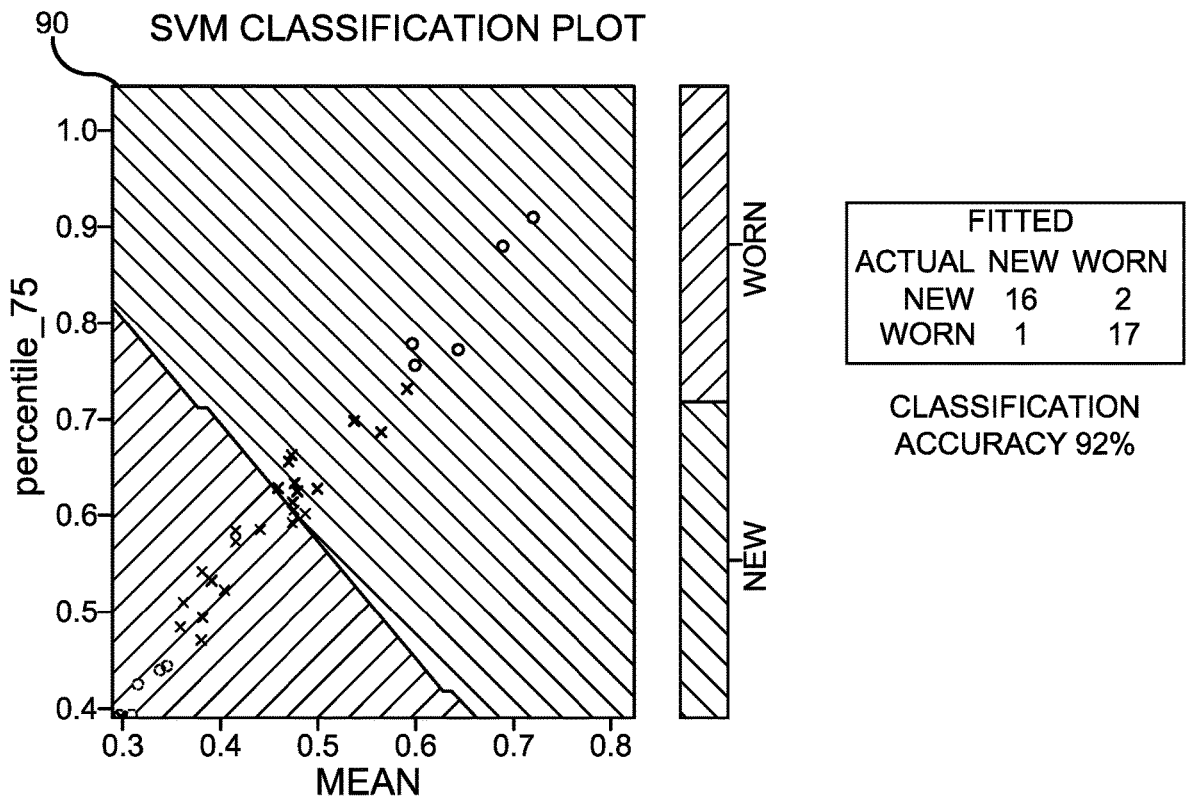
FIG. 11 is a graphical representation of model fitting when the vehicle is braking for the exemplary embodiment of the tire wear state estimation system and method of the present invention.

As shown in FIGS. 10 and 11, the braking slip estimator 86 performs feature visualization 88 and model fitting 90 of the extracted braking events 84. Having extracted the two most relevant features, which are the extracted braking events 84, a classification algorithm is used, such as a binary classifier based on support vector machine (SVM) algorithm. Performance of the binary classifier is shown in FIG. 11. Using the longitudinal slip formula 36 (FIG. 3), the braking slip estimator 86 calculates the estimated slip 96 of the tire 12 while the vehicle 10 is braking.

Thus, two separate classifiers or estimators, one based on braking data 86 and one based on acceleration data 72 make a prediction about the tire wear state. Finally, the prediction from the two classifiers or estimators 72 and 86 is combined in a tire slip analyzer 96 through weighted majority voting to make a final prediction for the tire wear state.

Each estimator 72 and 86 and/or the tire slip analyzer 96 also receives tire-specific information from the sensor 24 (FIG. 1). For example, the sensor 24 may transmit tire identification, tire pressure and tire temperature through the vehicle CAN bus 52 to each estimator 72 and 86 and/or the tire slip analyzer 96. The temperature of the tire, the tire inflation pressure, and the tire construction by manufacturer make and tire type influence the slip behavior of the tire 12, and are considered in the estimation of tire wear using feature extraction. Varying tire temperatures cause a shift in the slip behavior of the tire 12, as a cold tire may experience greater slip than a warm tire. Likewise, varying tire pressures causes a shift in the slip behavior of the tire 12, as a tire with higher pressure may experience greater slip than a tire with lower pressure. Tire construction also has an influence on the slip behavior of the tire 12. The tire identification, by identifying the particular tire 12 being evaluated, will enable construction type and manufacturer to be identified. In so doing, the particular effect of the tire identification on the slip behavior may be ascertained.

The degree and magnitude of the effect of the temperature of the tire, the tire inflation pressure, and the tire construction may be empirically determined and placed in an accessible database. Upon identifying a tire through tire identification recognition, measuring the tire pressure and measuring the tire temperature, the influence of pressure, temperature, and construction may be determined by consulting the prepared database. Such information is input into each estimator 72 and 86 and/or the tire slip analyzer 96 to enable an accurate estimation of the wear state of the tire 12.

Figure 14:
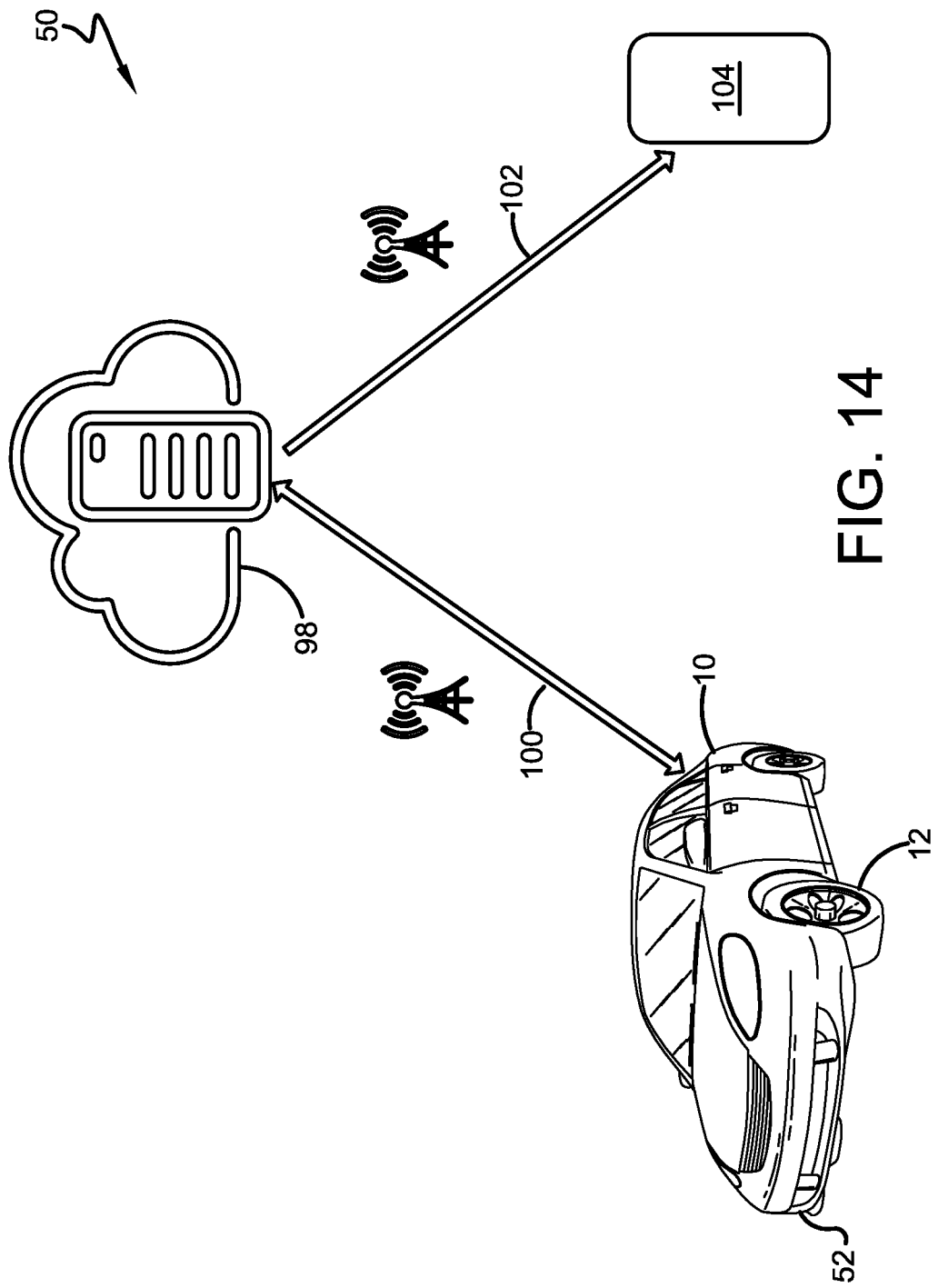
FIG. 14 is a schematic representation of an exemplary implementation of information display to a user for the exemplary embodiment of the tire wear state estimation system and method of the present invention.

The tire wear state estimation system 50 outputs the wear state of the tire 12 to the CAN-bus system 52. Through electronic communication with the CAN-bus system 52, the wear state may be communicated to other control systems on the vehicle 10, a user of the vehicle, a technician, or a central location for analysis. Aspects of the tire wear state estimation system 50 may be executed on a processor that is mounted on the vehicle 10. Alternatively, as shown in FIG. 14, aspects of the system 50 may be executed on a remote processor, such as a processor in a cloud-based server 98.

More particularly, the above-described data may be wirelessly transmitted 100 from the CAN-bus system 52 on the vehicle 10 to the server 98. The server 98 may include the rolling radius estimator 62, the acceleration event extractor 66, the acceleration slip estimator 72, the braking event extractor 82, the braking slip estimator 86 and/or the tire slip analyzer 96. Once calculated, the tire wear state may be wirelessly transmitted 100 to the CAN-bus system 52 and/or wirelessly transmitted 102 to a device 104 for display accessible to a user or a technician, such as a smartphone.

In this manner, the tire wear state estimation system 50 of the present invention estimates the wear state of the tire 12 by monitoring the tire slip behavior during braking and/or accelerating in real time, which is more accurate than techniques of the prior art.

The present invention also includes a method of estimating the wear state of a tire 12. The method includes steps in accordance with the description that is presented above and shown in FIGS. 1 through 14.

It is to be understood that the structure and method of the above-described tire wear state estimation system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire wear state estimation system comprising:
   at least one tire supporting a vehicle;
   a CAN bus system disposed on the vehicle,
   at least one sensor disposed on the vehicle and in electronic communication with the CAN bus system;
   the at least one sensor measuring selected parameters associated with the vehicle and communicating data for the selected parameters through the CAN bus system, including a first set of data, a second set of data and a third set of data;
   a rolling radius estimator operative to receive the first set of data and estimate a rolling radius for the at least one tire;
   an acceleration slip estimator operative to receive the second set of data and the estimated rolling radius to estimate the slip of the at least one tire during acceleration of the vehicle;
   a braking slip estimator operative to receive the third set of data and the estimated rolling radius to estimate the slip of the at least one tire during braking of the vehicle; and
   a tire slip analyzer to correlate the estimation of the slip of the at least one tire during acceleration of the vehicle and the slip of the at least one tire during braking of the vehicle and generate an estimated wear state of the at least one tire.

2. The tire wear state estimation system of claim 1, wherein the first set of data includes a speed of a wheel, a speed of the vehicle, an acceleration of the vehicle, and a position of a vehicle throttle.

3. The tire wear state estimation system of claim 2, wherein the rolling radius estimator generates a histogram for each data parameter from the first set of data over a selected period of time and estimates the rolling radius using batch mode estimation.

4. The tire wear state estimation system of claim 1, wherein the second set of data includes a speed of the vehicle, an acceleration of the vehicle and a position of a vehicle throttle.

5. The tire wear state estimation system of claim 4, further comprising an acceleration event extractor operative to generate a histogram for each data parameter from the second set of data over a selected period of time and characterize data from each slip histogram according to selected features.

6. The tire wear state estimation system of claim 5, wherein the selected features include a mean, a median, a $25^{th}$ percentile, a $75^{th}$ percentile, an interquartile range, a $9^{th}$ percentile and a $91^{st}$ percentile.

7. The tire wear state estimation system of claim 6, wherein the acceleration event extractor screens and selects the most relevant of the selected features for acceleration.

8. The tire wear state estimation system of claim 7, wherein the most relevant of the selected features for acceleration include the median and the $25^{th}$ percentile.

9. The tire wear state estimation system of claim 8, wherein the acceleration slip estimator performs feature visualization and model fitting of the most relevant of the selected features for acceleration to calculate the estimated slip of the at least one tire during acceleration of the vehicle.

10. The tire wear state estimation system of claim 1, wherein the third set of data includes a speed of the vehicle, an acceleration of the vehicle, a brake pedal position and a steering wheel angle.

11. The tire wear state estimation system of claim 10, further comprising a braking event extractor operative to generate a histogram for each data parameter from the third set of data over a selected period of time and characterize data from each slip histogram according to selected features.

12. The tire wear state estimation system of claim 11, wherein the selected features include a mean, a median, a $25^{th}$ percentile, a $75^{th}$ percentile, an interquartile range, a $9^{th}$ percentile and a $91^{st}$ percentile.

13. The tire wear state estimation system of claim 12, wherein the braking event extractor screens and selects the most relevant of the selected features for braking.

14. The tire wear state estimation system of claim 13, wherein the most relevant of the selected features for braking include the mean and the $75^{th}$ percentile.

15. The tire wear state estimation system of claim 14, wherein the braking slip estimator performs feature visualization and model fitting of the most relevant of the selected features for braking to calculate the estimated slip of the at least one tire during braking of the vehicle.

16. A method for estimating the wear state of a tire supporting a vehicle, the method comprising the steps of:
providing at least one sensor disposed on the vehicle and in electronic communication with a CAN bus system;
measuring selected parameters associated with the vehicle using the at least one sensor;
communicating data for the selected parameters through the CAN bus system, including a first set of data, a second set of data and a third set of data;
estimating a rolling radius for the at least one tire with the first set of data;
estimating the slip of the at least one tire during acceleration of the vehicle with the second set of data and the estimated rolling radius;
estimating the slip of the at least one tire during braking of the vehicle with the third set of data and the estimated rolling radius; and
correlating the estimation of the slip of the at least one tire during acceleration of the vehicle and the slip of the at least one tire during braking of the vehicle to generate an estimated wear state of the at least one tire.

17. The method for estimating the wear state of a tire supporting a vehicle of claim 16, wherein the step of estimating the slip of the at least one tire during acceleration of the vehicle includes generating a histogram for each data parameter from the second set of data over a selected period of time and characterizing data from each slip histogram according to selected features.

18. The method for estimating the wear state of a tire supporting a vehicle of claim 17, wherein the step of estimating the slip of the at least one tire during acceleration of the vehicle includes performing feature visualization and model fitting of a set of most relevant features from the selected features to calculate the estimated slip of the at least one tire during acceleration of the vehicle.

19. The method for estimating the wear state of a tire supporting a vehicle of claim 16, wherein the step of estimating the slip of the at least one tire during braking of the vehicle includes generating a histogram for each data parameter from the third set of data over a selected period of time and characterizing data from each slip histogram according to selected features.

20. The method for estimating the wear state of a tire supporting a vehicle of claim 19, wherein the step of estimating the slip of the at least one tire during braking of the vehicle includes performing feature visualization and model fitting of a set of most relevant features from the selected features to calculate the estimated slip of the at least one tire during braking of the vehicle.

* * * * *